Sept. 22, 1925.                    1,554,957
F. A. ENGLE
RIM AND TIRE CARRIER
Filed March 27, 1922
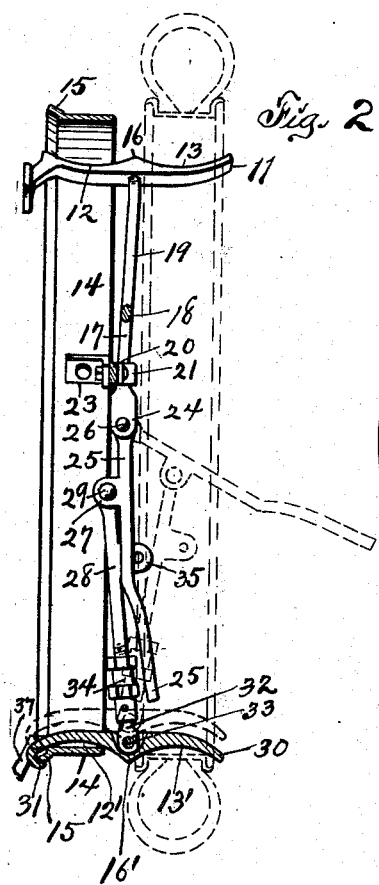
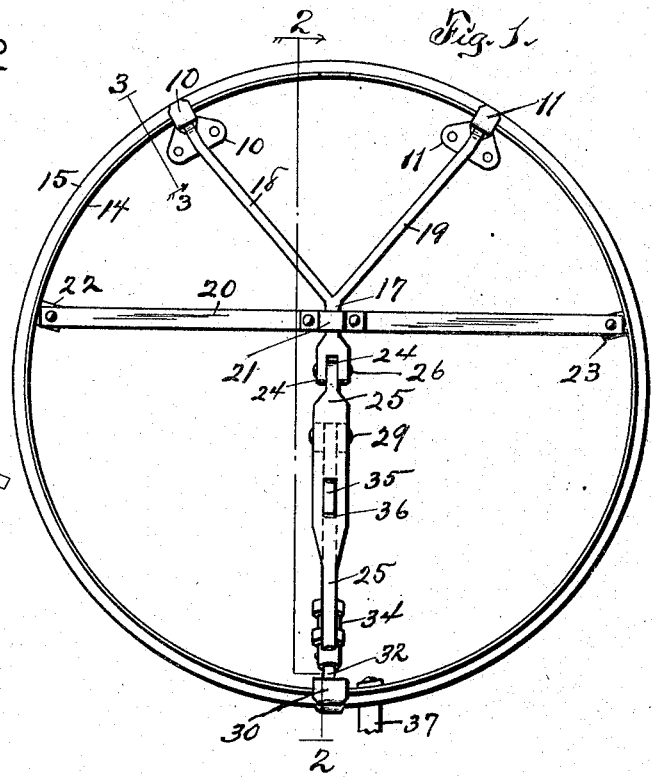
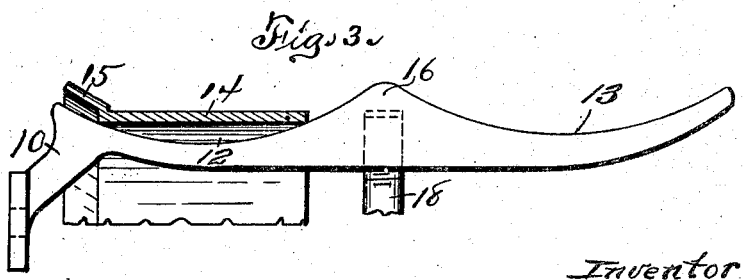
Inventor:
Fred A. Engle.
By Silas L. Sweet
Atty Patented Sept. 22, 1925.

1,554,957

UNITED STATES PATENT OFFICE.

FRED A. ENGLE, OF MOUND PRAIRIE TOWNSHIP, JASPER COUNTY, IOWA, ASSIGNOR OF ONE-FOURTH TO ANDREW ENGLE AND ONE-FOURTH TO CHARLES A. LIND, BOTH OF JASPER COUNTY, IOWA.

RIM AND TIRE CARRIER.

Application filed March 27, 1922. Serial No. 547,143.

*To all whom it may concern:*

Be it known that I, FRED A. ENGLE, a citizen of the United States of America, and resident of Mound Prairie Township, Jasper County, Iowa, have invented a new and useful Rim and Tire Carrier, of which the following is a specification.

An object of this invention is to provide improved means for supporting one or more wheel rims or combined rims and tires on an automobile.

A further object of this invention is to provide improved means for locking and safely retaining one or more wheel rims or combined rims and tires on an automobile.

A further object of this invention is to provide improved means for removing and replacing rims or combined rims and tires relative to a carrier on an automobile.

My invention consists in the construction, arrangement and combination of elements hereinafter set forth, pointed out in my claims and illustrated by the accompanying drawing, in which—

Figure 1 is an elevation showing my improved device mounted as required for practical use. Figure 2 is a sectional elevation of the device on the indicated line 2—2 of Figure 1, dotted lines indicating releasing positions of some of the parts thereof. Figure 3 is a cross-section on the indicated line 3—3 of Figure 1, on an enlarged scale.

In the construction of the device as shown the numerals 10, 11 designate brackets, alike in construction, adapted to be mounted in spaced relation on a suitable support such as the body of an automobile, not shown. Each of the brackets 10, 11 is formed with two or more concaved seats 12, 13, end to end, the seat 12 being shaped and arranged to receive and accommodate a supporting rim 14 loosely mounted in and extending transversely thereof. A flange 15 is formed on the rear margin of the supporting rim 14 at the rear end of the seat 12 and is adapted to engage the rear marginal portion of a wheel rim adapted to be mounted in said supporting rim. A rib 16 is formed in the central portion of each bracket between the seats 12, 13 and opposite sides of said rib merge into adjacent end portions of the seats. A forked bar 17 is formed with threaded portions on the extremities of its arms 18, 19, which portions are screwed into holes in the central portions and ribs 16 of the brackets 10, 11 and, when the brackets are mounted on a suitable support such as a car body, the screw connection serves to prevent removal of the brackets from the bar 17. A bar 20 extends across and is slidingly secured, by a clip 21, to the bar 17, and end portions of said bar are pivoted to angles 22, 23 fixed to and within the supporting rim 14. Parallel ears 24 are formed on the lower end portion of the bar 17 and a lever 25 has its upper end extended between and pivoted thereto by a rivet 26 mounted in registering apertures therein. Parallel ears 27 are formed on and extend rearwardly from the lever 25. A link 28 has one end inserted between the ears 27 and pivoted thereto by a rivet 29 mounted in registering apertures therein. A shoe 30, corresponding in size and character with the projecting portions of the brackets 10, 11, is provided and is formed with concaved seats 12', 13', end to end, a hooked lug 31 at its rear end embracing the flange 15 at times, and a rib 16', the seats and rib corresponding to similar elements in said brackets. The shoe 30 is inverted relative to the brackets 10, 11 and normally is spaced therefrom substantially the diameter of the supporting rim 14, which is received in and extends transversely of the seat 12'. A joint member 32 extends through the shoe 30 and within the rib 16' and is pivoted thereto by a pin 33 and said joint member is adjustably secured to the lower end of the link 28, by a turnbuckle or internally threaded sleeve 34. Thus is provision made for pivoting the shoe 30 on the lower end of the link 28. A staple or eye 35 is formed on the link 28 relatively nearer to the ears 27 than to the turnbuckle or sleeve 34 and said staple is adapted to extend at times through a slot 36 in the lever 35, said slot being located on the opposite side of the ears 27 from the rivet 26. The staple or eye 35 is adapted to receive and carry a padlock of any suitable or desired form. A bracket 37 is fixed to the lower portion of the rim 14 and is adapted to extend to a suitable support, such as the car body.

In practical use the lock is removed from the staple 35 and the lever 25 is manually moved outwardly into the position shown by dotted lines in Figure 2, such movement being through an arc having its center in the rivet 26. At the same time manual pressure is applied rearwardly and somewhat downwardly to cause a disengagement of the hooked lug 31 from the flange 15. Thereafter movement of the lever raises the shoe 30 through the medium of the link 28, said shoe and link assuming substantially the position shown by dotted lines in Figure 2. Thereupon one or more wheel rims, (dotted lines Figure 2) provided if desired with tires preferably in inflated condition, may be mounted on the rim 14 and the seats 13. Then the shoe 30 is placed manually over an adjacent portion of the rim 14, the hooked lug 31 engaging the inner flange 15, and, while said shoe is held in such position, it is clamped upon the rim 14 by reverse movement of the lever 25 manually, such reverse movement being continued until said lever, the link 28 and shoe 30 are brought into the positions shown by solid lines in Figure 2. The wheel rims may vary slightly in diameter and to compensate therefor the turnbuckle or sleeve 34 may be manipulated to loosen or tighten the clamping effect on the shoe effected by manipulation of the lever 25 and link 28. This clamping effect should be material and considerable to the end of exerting a large degree of expansive force on the interior of the rim 14 and on the brackets engaged by the rim. Such expansive force minimizes the risk or danger of removal accidentally or for purposes of theft of a wheel rim and tire by flexing, springing or bending the extremities of the brackets or shoe. This done, the padlock is so placed in the staple or eye 35 as to prevent outward movement of the lever 25; and the wheel rims, and tires thereon if any, are effectively retained and carried. It is to be understood that the tires may be further protected against theft from the rims by the use of a chain or other device extending around the tires, rims and bracket or yoke arm, and such means also being secured by a padlock in its ends as is now common and well known.

The loosely mounted rim 14 provides a frame and support for the operating elements, a large surface for engagement by the rim of a tire, and a means for positive engagement by the hooked lug 31 of the suspended shoe, whether or not a tire is mounted on the device. More particularly, it provides means, when the device is not carrying a tire or rim, for placing the operative elements in closed and locked position so as to prevent vibration and rattling of the parts in use.

The bar 20 provides a brace for the rim 14 at right angles to the brace afforded by the forked bar, lever and link.

The threaded connection of the arms 18, 19 of the forked rod to the brackets 10, 11, and of the joint member 32 to the link through the turnbuckle or sleeve 34, makes it possible to use the carrier for tires and rims of varying diameter.

I claim as my invention—

1. A rim and tire carrier, comprising brackets adapted to be mounted on a suitable support, each bracket being formed with spaced seats end to end, a rim adapted to be secured to said support and overlaying and extending across the rearmost seats of the brackets loosely, a rigid fork adjustably secured to said brackets, a bar extending across and slidingly connected in its central portion to the stem of the fork, the outer ends of said bar being secured to said rim, a lever fulcrumed on said fork, a link pivoted at one end to and intermediate of the ends of said lever, and a shoe pivotally carried on the opposite end of the link, said shoe extending across and within said rim and formed with seats end to end on its outer face, one of said seats being adapted to receive said rim loosely, said link and lever being adapted to be locked together.

2. A rim and tire carrier, comprising brackets adapted to be mounted on a suitable support, each bracket being formed with spaced seats end to end, a rim adapted to be secured to said support and overlaying and extending across the rearmost seats of the brackets loosely, a rigid fork adjustably secured at the ends of its arms to said brackets, a bar extending across and slidingly connected in its central portion to the stem of the fork, the outer ends of said bar being pivotally connected to said rim, a lever pivoted on said fork, a link pivoted at one end to and intermediate of the ends of said lever, and a shoe pivotally carried on the opposite end of the link, said shoe extending across and within said rim and formed with seats end to end on its outer face, one of said seats being adapted to receive said rim loosely, said link and lever being adapted to be locked together.

Signed at Des Moines, in the county of Polk and State of Iowa, this 14th day of December, 1921.

FRED A. ENGLE.